(12) United States Patent
Duda

(10) Patent No.: US 7,159,328 B1
(45) Date of Patent: Jan. 9, 2007

(54) MEASUREMENT GAUGE INCORPORATING A LEVEL

(76) Inventor: Peter Thompson Duda, 3 Blueberry La., Nashua, NH (US) 03062

( * ) Notice: Subject to any disclaimer, the term of this patent is extended or adjusted under 35 U.S.C. 154(b) by 0 days.

(21) Appl. No.: 11/113,923

(22) Filed: Apr. 25, 2005

(51) Int. Cl.
G01D 21/00 (2006.01)
G01C 9/00 (2006.01)
G01C 9/24 (2006.01)
B43L 7/10 (2006.01)

(52) U.S. Cl. .................. 33/647; 33/370; 33/374; 33/381; 33/419; 33/454; 33/464; 33/484

(58) Field of Classification Search ............... 33/646, 33/647, 648, 649, 526, 527, 464, 465, 469, 33/470, 472, 473, 456, 458, 459, 460
See application file for complete search history.

(56) References Cited

U.S. PATENT DOCUMENTS

| | | | |
|---|---|---|---|
| 371,210 A | | 10/1887 | Naramore |
| 704,369 A | * | 7/1902 | Pritt .............................. 33/451 |
| 735,128 A | * | 8/1903 | Murphy ........................ 33/472 |
| 1,157,514 A | * | 10/1915 | Earl ............................. 33/460 |
| 1,160,920 A | * | 11/1915 | Lucas .......................... 33/451 |
| 1,349,348 A | | 8/1920 | Thielman |
| 1,414,556 A | * | 5/1922 | Dresen ........................ 33/649 |
| 1,514,323 A | * | 11/1924 | Kirchner ..................... 33/460 |
| 1,601,138 A | | 9/1926 | Moore |
| 2,042,213 A | | 5/1936 | Ducey |
| 2,206,760 A | * | 7/1940 | Ballard ................. 235/61 GM |
| 2,213,148 A | * | 8/1940 | Pyle ............................ 33/451 |
| 2,686,973 A | | 8/1954 | Christianson et al. |
| 2,770,043 A | * | 11/1956 | Kwiecinski ................. 33/452 |
| 3,015,164 A | * | 1/1962 | Antell ......................... 33/473 |
| 3,133,357 A | | 5/1964 | Gayan |
| 3,289,301 A | * | 12/1966 | Hanson ....................... 33/353 |
| 3,991,474 A | | 11/1976 | Rath |
| 4,899,459 A | | 2/1990 | Taggart |
| 5,335,423 A | * | 8/1994 | McLaughlin ................ 33/647 |
| 5,438,761 A | * | 8/1995 | Krumszyn et al. ............ 33/451 |
| 5,461,794 A | * | 10/1995 | Huang ......................... 33/470 |
| 5,617,642 A | * | 4/1997 | Marios ........................ 33/526 |
| 5,701,680 A | * | 12/1997 | Garcia et al. ................ 33/526 |
| 5,720,114 A | | 2/1998 | Guerin |
| 6,260,283 B1 | * | 7/2001 | Abernathy et al. ........... 33/419 |
| 6,421,927 B1 | * | 7/2002 | Bach et al. .................. 33/427 |
| 6,510,616 B1 | * | 1/2003 | Sparkman ................... 33/460 |
| 2002/0100181 A1 | | 8/2002 | Evans |
| 2003/0033724 A1 | * | 2/2003 | Barbosa ...................... 33/526 |

FOREIGN PATENT DOCUMENTS

| | | |
|---|---|---|
| CA | 2.289.800 | 5/2001 |
| CA | 2.400.781 | 8/2001 |
| WO | WO01/61272 | 8/2001 |

* cited by examiner

Primary Examiner—Yaritza Guadalupe-McCall
Assistant Examiner—Amy R. Cohen
(74) Attorney, Agent, or Firm—Michael I Kroll (57) ABSTRACT

Apparatus 10 discloses a handle 32 for manipulating the device and an extending rule portion 18 having a series of markings or measurements 26 embossed along its edge serving as a base of spacing measurement for a pivotally mounted swing arm 22 and a slide arm 24 perpendicularly attached thereto that may be adjusted to a desired distance. After a desired distance is set the swing arm 22 serves to maintain spacing and parallelism by having a bubble level 36 fabricated into each of its ends to test if the materials held flush are level. After correct measurements are made the apparatus 10 may then be used as a gauging tool for the quick and ready spacing and setting of materials afterwards.

5 Claims, 10 Drawing Sheets

MEASUREMENT GAUGE INCORPORATING A LEVEL

BACKGROUND OF THE INVENTION

1. Field of the Invention

The present invention relates generally to measurement devices and, more specifically, to a sliding stick used for the precise and accurate placing and installation of siding, balusters, roofing and other materials involved in carpentry practices where the accurate spacing and leveling of extending parallel members apply.

The sliding stick of the present invention comprises a handle for manipulating the device and an extending potion having a series of markings or measurements embossed along its edge serving as a base of spacing measurement for a pivotally mounted swing arm and a slide arm perpendicularly attached thereto that may be adjusted to a desired distance. After a desired distance is set the swing arm serves to maintain spacing and parallelism by having a bubble level fabricated into each of its ends to test if the materials held flush are level. After correct measurements are made the present invention may then be used as a gauging tool for the quick and ready spacing and setting of materials afterwards.

2. Description of the Prior Art

There are other measurement devices designed for placing siding. Typical of these is U.S. Pat. No. 371,210 issued to Naramore on Oct. 11, 1887.

Another patent was issued to Thielman on Aug. 10, 1990 as U.S. Pat. No. 1,349,348. Yet another U.S. Pat. No. 1,601,138 was issued to Moore on Sep. 28, 1926 and still yet another was issued on May 26, 1936 to Ducey as U.S. Pat. No. 2,042,213.

Another patent was issued to Christianson et al on Aug. 24, 1954 as U.S. Pat. No. 2,686,973. Yet another U.S. Pat. No. 3,133,357 was issued to Gayan on May 19, 1964. Another was issued to Rath on Nov. 16, 1976 as U.S. Pat. No. 3,991,474 and still yet another was issued on Feb. 13, 1990 to Taggart as U.S. Pat. No. 4,899,459.

Another patent was issued to Guerin on Feb. 24, 1998 as U.S. Pat. No. 5,720,114. Yet another U.S. Patent Application No. 2002/0100181 was issued to Evans on Aug. 1, 2002. Another was issued to Nixon on May 15, 2001 as Canadian Patent No. CA 2,289,800 and still yet another was issued on Feb. 20, 2001 to Rempe as Canadian Patent No. CA 2,400,781 and even still yet another was issued on Feb. 20, 2001 to Rempe as PCT No. W001/61272.

U.S. Pat. No. 371,210

Inventor: H. L. Naramore

Issued: Oct. 11, 1887

A tool or gauge for wood workers and other mechanics, consisting of an extensible rod or bar, A, Consisting of the two parts a a', the former provided with a slot, h, and the latter with the slot c and shallow groove e, a thumb screw, f, of the inner end of part a, having its shank extended through slot c in part a', a block, d, affixed to the end of said screw and adapted to slide in groove e, and thumb screw I on the inner end of part a', having its shank extended through slot h in part a', said rod or bar a being provided on its ends with adjustable arms c, substantially as and for the purposes set forth.

U.S. Pat. No. 1,349,348

Inventor: G. F. Thielman

Issued: Aug. 10, 1920

A stair rule comprising a pair of ostensibly connected bars, arms mounted on the outer ends of the bars for adjustment against the inner faces of the stair stringers when positioned there between, stop members secured to the outer ends of the bars, and means including a single member for securing each stop member and the adjustment arm fixed to the respective bars.

U.S. Pat. No. 1,601,138

Inventor: D. Moore

Issued: Sep. 28, 1926

A gauge comprising a main body, plates having clamps by means of which they are affixed to the extremities of the body, a protractor head having a cross bar and lug through which pivotal support is had upon each of the clamp plates, scribing plates having studs insertable through said cross bars and nuts upon said studs for clamping the scribing plates in position upon the cross bars of said protractor head.

U.S. Pat. No. 2,042,213

Inventor: R. H. Ducey

Issued: May 26, 1936

In a tool, the combination of an outside caliper with a terminal gauge element, and clamping means therefore; said gauge being a flat plate of substantially L-shape; said clamping means comprising a stud fixed on and projecting at one face of the caliper; and said gauge element having in its basal portion an extensive opening through which said stud extends; said opening at every location across it, having breadth dimension considerably greater than the diameter of said stud, thereby permitting its positional adjustments in all directions for straight line adjustment of the gauge element in any compass direction with respect to the caliper.

U.S. Pat. No. 2,686,973

Inventor: M. E. Christianson et al.

Issued: Aug. 24, 1954

An angle gauge comprising a channeled case having inwardly extending opposed flanges at the front open side of the case, a pair of bars enclosed in the case and slidable inwardly and outwardly at the ends of the case, set screws threaded in the bars adjacent to the inner ends of the latter and bearing against the inside of the case to force the bars forward in frictional binding contact behind the flanges, a second set screw threaded through each bar adjustment to the outer end of the latter, an arm having a longitudinal slot therein for slidably and pivotally mounting on each of said second named set screws, said arms being swingable into and out of longitudinal conforming relation and an adjacent bar for sliding either therewith or independently thereof into and out of the case, said arms having rounded pivoted ends provided with a circular angle scale, and a flange on each of said second name set screws binding against the arms to secure the latter in angularly adjusted position at the outer ends of the bars, said arms and said bars being ostensibly adjustable at opposite ends of the case, and said arms being positioned forwardly of the bars when retracted therewith in the case to bind the arms against the flanges of the case by the tightening of the first named set screws against the rear of the case to lock both the bars and arms in the case, and said case and said bars and arms having graduated scales at their front surfaces.

U.S. Pat. No. 3,133,357

Inventor: L. A. Gayan

Issued: May 19, 1964

In a device for positioning a length of siding preparatory to the nailing of the same to a wall of sheathing or other supporting structure, an elongated upper guide member having an inner surface engageable along substantially the entire width of the siding to be applied and having an inwardly extending lower edge abuttingly engage able with the lower edge of the siding to be applied, said upper guide member further having an inwardly tapered outer surface adjacent the lower portion thereof, an elongated lower guide member overlying said upper guide member and slidably engageable with the tapered surface of the said upper guide member, said lower guide member having an inwardly extending lower edge of the coarse of siding immediately below the siding to be applied, means carried by the upper end of said lower guide member for longitudinally biasing said device between the said sheathing above the siding to be applied and the coarse siding immediately therebelow.

U.S. Pat. No. 3,991,474

Inventor: Lonnie Milo Rath

Issued: Nov. 16, 1976

The invention comprises a measurement tool. The measurement tool has a pair of elongated main measurement sticks which are slidably mounted to move longitudinally toward and away from one another. The main measurement sticks have indicia thereon to identify the length of the two main measurement sticks. A pair of lateral stick members are pivotally mounted centrally of their length to the outer ends of the main sticks. The laterally stick members have half circle center portions with markings thereon to identify the angular position of the laterally stick members. A measurement stick is slidably mounted to telescope longitudinally inward and outward in one lateral stick member. The slidable stick has a hole at its outer end to receive the point of a pencil whereby the pencil point may be inserted into the hole and the slidable stick and the one lateral stick member may be pivoted about the pivotal axis of the lateral stick and the pencil will draw a circle about said axis or surface beneath the tool depending upon the adjustment of the sliding stick to the one lateral stick member.

U.S. Pat. No. 4,899,459

Inventor: Andrew W. Taggart

Issued: Feb. 13, 1990

A disposable tool for assisting in applying horizontal and diagonal siding. This comprises a strap having a plurality of attached and regularly spaced apart hangers. The hangers are spaced to provide for the desired overlap of siding as well as the correct distance between the bottom edges of siding pieces. In one version of the tool it is mounted so that it positions and holds the lower edge of a siding strip prior to nailing. The hanger portions are removable after the siding strips have been positioned and secured to a wall. In another version the tool is mounted so that it positions and locates the upper edge of a siding strip. In this case it remains in place and is covered as successively higher strips of siding are applied.

U.S. Pat. No. 5,720,114

Inventor: Scott J. Guerin

Issued: Feb. 24, 1998

A tool for aligning vinyl corner posts during installation has a flat, generally L-shaped body member. The body member is formed from first and second leg portions which meet in a 90 degree angle. An aperture is formed in the interior edge of the body member which is symmetrically disposed with respect to a 90 degree angle for receiving a vinyl corner post. To use the tool, the vinyl corner post is pushed into the aperture where it fits snugly. The assembly is then pressed against the corner of the building, and the flat interior edges of the legs of the body member are pressed against the sides of the house to align the corner post to the building. The corner post is then nailed into position, while sliding the tool on the corner post to maintain the proper orientation along the entire length of the post U.S. Patent Application Number US2002/0100181A1

Inventor: Bryan Chris Evans

Issued: Aug. 1, 2002

A tool for installation of horizontal siding strips having a flat front face and a rear face with a top and bottom portion, and having the top portion sloping rearwardly. The farther has a rearwardly projecting lip located at the bottom portion of the rear face and an upwardly projecting lip extending along the front face. A method for installing horizontal siding strips using the tool.

Canadian Patent Number CA2,289,800

Inventor: Russell Nixon

Issued: May 15, 2001

A siding layout tool includes a body having a first face, a second face and at least one alignment guide. A plurality of holes extend through the body from the first face to the second face. A member is provided having a working end. The member is received in a selected one of the plurality of holes in the body, with the working end extending from the second face. The siding layout tool, as described, permits one handed operation, which leaves the users other hand free Canadian Patent Number CA2,400,781

Inventor: Steve Rempe

Issued: Feb. 20, 2001

A tool (10) for installation of building siding includes an elongate base portion (12), an arm portion (14) extending at a right angle thereto, and terminates in a flange portion (16) extending at a right angle from the arm (14). A clip member (18) is carried on the upper surface of the base (12), and extends toward the arm portion (14) to define a gap (22) therebetween. For use, one or more of the tools (10) are placed on the bottom edge of the piece e of siding so that the siding is releasably captured in the gap (22). The piece of siding can then be placed at an appropriate position on a wall above a previously-installed piece of siding, so that the flange (16) rests on the upper edge of the previously installed piece. The installer may rest the piece of new siding, with the tool(s) in place, on the previously installed piece of siding, enabling the installer to temporarily nail the new piece in place. The tool(s) can then be removed from the new piece by twisting and pulling down on the handle portion.

International Patent Application Number W001/61272A1

Inventor: Steve Rempe

Issued: Feb. 20, 2001

A tool (10) for installation of building siding includes an elongate base portion (12), an arm portion (14) extending at a right angle thereto, and terminates in a flange portion (16) extending at a right angle from the arm (14). A clip member (18) is carried on the upper surface of the base (12), and extends toward the arm portion (14) to define a gap (22) therebetween. For use, one or more of the tools (10) are placed on the bottom edge of the piece e of siding so that the siding is releasably captured in the gap (22). The piece of siding can then be placed at an appropriate position on a wall above a previously-installed piece of siding, so that the flange (16) rests on the upper edge of the previously installed piece. The installer may rest the piece of new siding, with the tool(s) in place, on the previously installed piece of siding, enabling the installer to temporarily nail the new piece in place. The tool(s) can then be removed from the new piece by twisting and pulling down on the handle portion.

While these measurement devices may be suitable for the purposes for which they were designed, they would not be as suitable for the purposes of the present invention, as hereinafter described.

SUMMARY OF THE PRESENT INVENTION

The present invention discloses a handle for manipulating the device and an extending potion having a series of markings or measurements embossed along its edge serving as a base of spacing measurement for a pivotally mounted swing arm and a slide arm perpendicularly attached thereto that may be adjusted to a desired distance. After a desired distance is set the swing arm serves to maintain spacing and parallelism by having a bubble level fabricated into each of its ends to test if the materials held flush are level. After correct measurements are made the present invention may then be used as a gauging tool for the quick and ready spacing and setting of materials afterwards.

A primary object of the present invention is to provide a measurement device having an extending sliding stick portion with a slide arm and a pivot arm to assist in the correct placement and measurement during construction.

Another object of the present invention is to provide a measurement device having a pivot arm with a plurality of levels for the leveling and maintenance of parallelism between members.

Yet another object of the present invention is to provide a measurement device for siding having a sliding arm that may be set to measure spacing between members.

Still yet another object of the present invention is to provide a measurement device having both a swing arm and sliding arm that work in cooperation to produce properly spaced and leveled members.

Another object of the present invention is to provide a measurement device for having a handle for easy manipulation thereof.

Additional objects of the present invention will appear as the description proceeds.

The present invention overcomes the shortcomings of the prior art by providing a measurement gauge having a pivotal swing arm with a plurality of bubble levels and a movable slide arm that work in cooperation to allow for a user to establish correctly spaced and leveled placement of members. Additionally the sliding stick has a plurality of measurements upon its surface to establish correct spacing and a handle to facilitate easy manipulation thereof.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.
- 10 present invention
- 12 user
- 14 siding
- 16 balusters
- 18 rule member base
- 20 hand rail
- 22 swing arm
- 24 sliding arm
- 26 rule
- 28 sliding knob
- 30 swing knob
- 32 handle
- 34 channel
- 36 level
- 38 pivot point swing arm
- 40 pivot point sliding arm
- 42 knurled knob

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to appended the claims.

Figure 1:
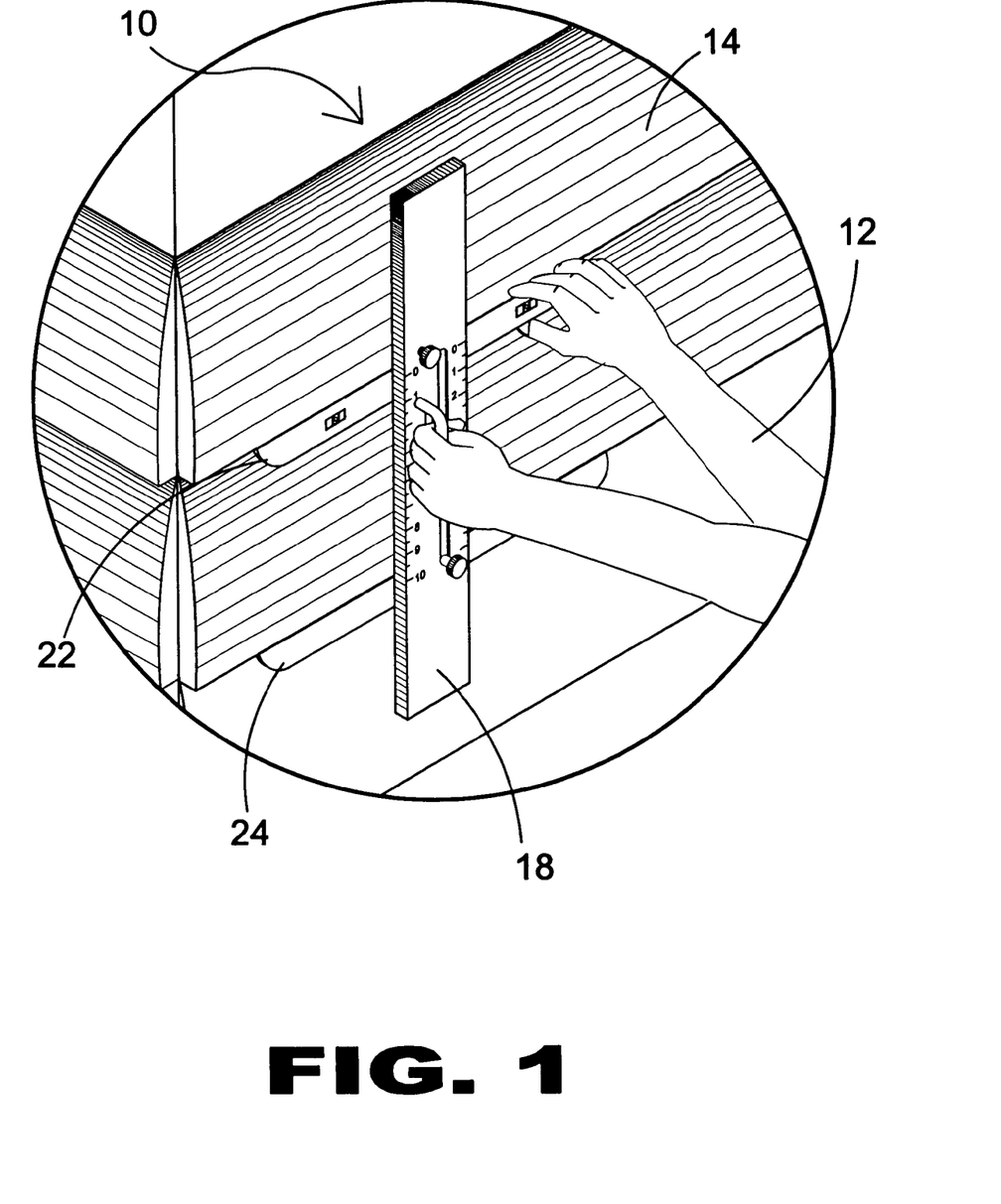
FIG. 1 is an illustrative view of the present invention in use.

Turning to FIG. 1, shown therein is an illustrative view of the present invention 10 in use by a user 12. The present invention 10 discloses a tool forming a gauge comprising a rule member 18 with pivotal transverse members 22, 24 one of which incorporates spaced apart levels. The rule member 18 comprises a slot for moving transverse member 24 relative to the opposing transverse member 22 with the transverse members movable from a transverse position in an operative mode to a co-longitudinal position with the rule portion in a closed position. Also shown is siding 14.

Figure 2:
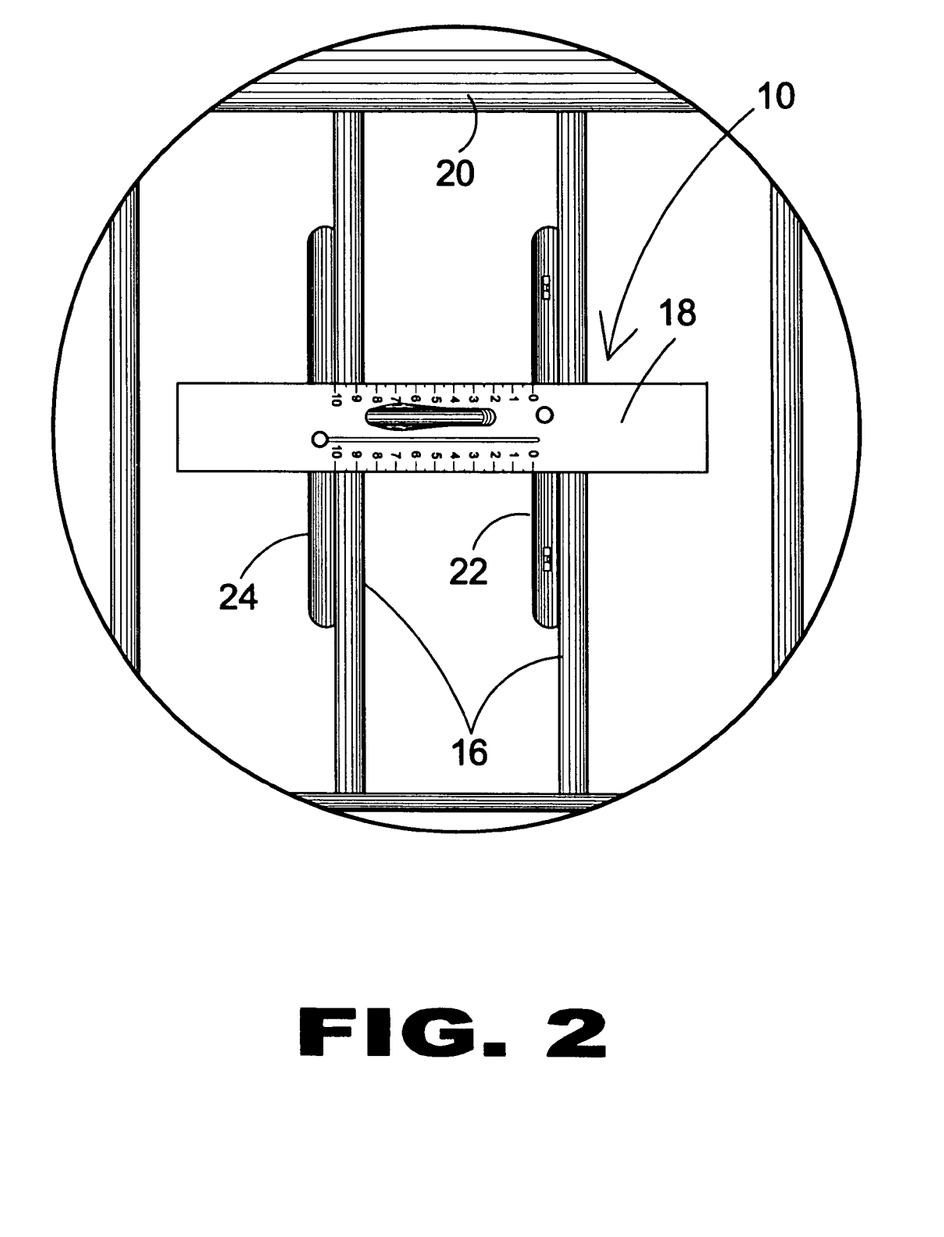
FIG. 2 is an illustrative view of the present invention in use.

Turning to FIG. 2, shown therein is an illustrative view of the present invention 10 in use. The present invention 10 is an effective and accurate tool that can be used for siding houses, placing interior and exterior balusters 16, roofing, spacing on cap walls and numerous other tasks. The device 10 is small enough to pack away and the arms 22, 24 turn into the housing for compact storage. Also shown are the rule member 18 and hand rail 20.

Figure 3:
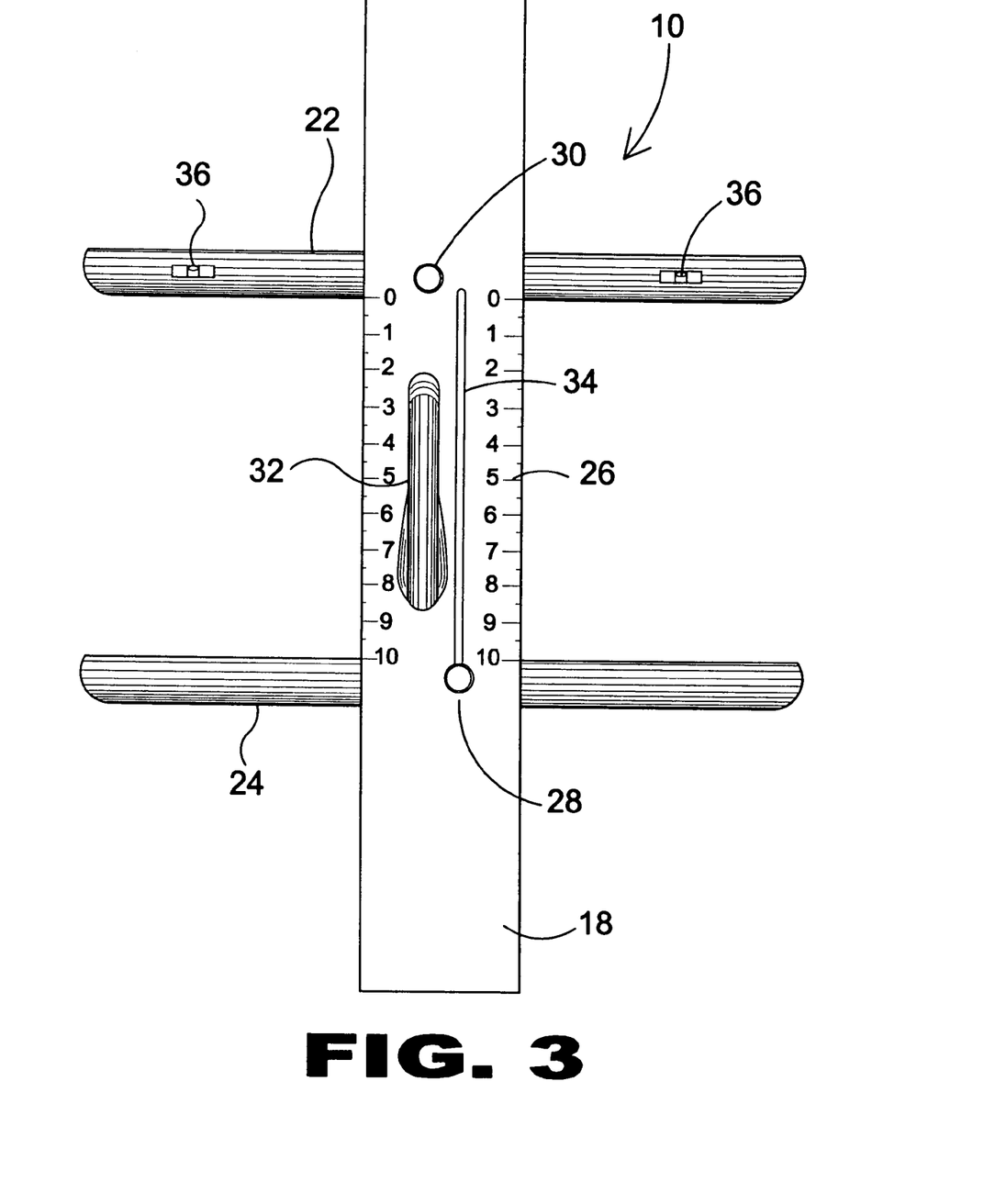
FIG. 3 is an illustrative view of the present invention in use.

Turning to FIG. 3, shown therein is an illustrative view of the present invention 10 in use. The present invention 10 comprises a fixed pivotal or swing arm 22 proximate to slot 34 and a sliding arm 24. In operation, the fixed arm 22 is positioned against a first member, e.g. a baluster as shown in FIG. 2, while the sliding arm 24 is moved to a predetermined position for placement of a second member. Thereafter, the measurement gauge or rule 26 on the edges of rule member 18 extending from one end of the slot 34 to the other end of the slot will be used to maintain the spacing between subsequent members. Also shown are the sliding knob 28, swing knob 30, handle 32, and left and right levels 36 disposed between the ends of arm 22 and its center.

Figure 4:
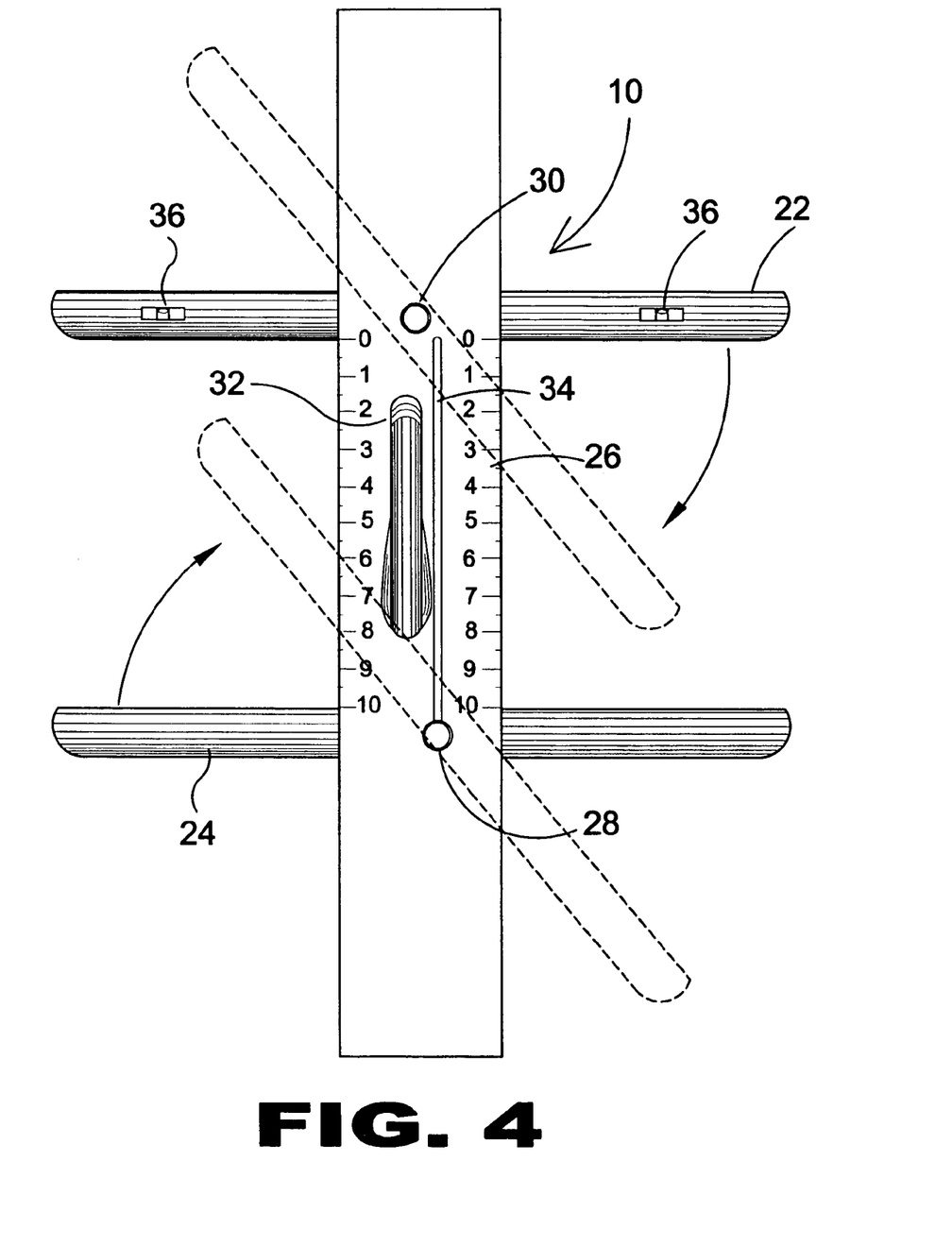
FIG. 4 is a front view of the present invention.

Turning to FIG. 4, shown therein is a front view of the present invention 10. Shown is the present invention 10 disclosing an effective and accurate tool that can be used for siding houses, placing interior and exterior balusters, roofing, spacing on cap walls and numerous other tasks. The device 10 is small enough to pack away and the arms turn into the housing for compact storage. One stable arm 22 turns but does not slide and is equipped with levels 36 for accurate placement. Other previously disclosed elements are also shown.

Figure 5:
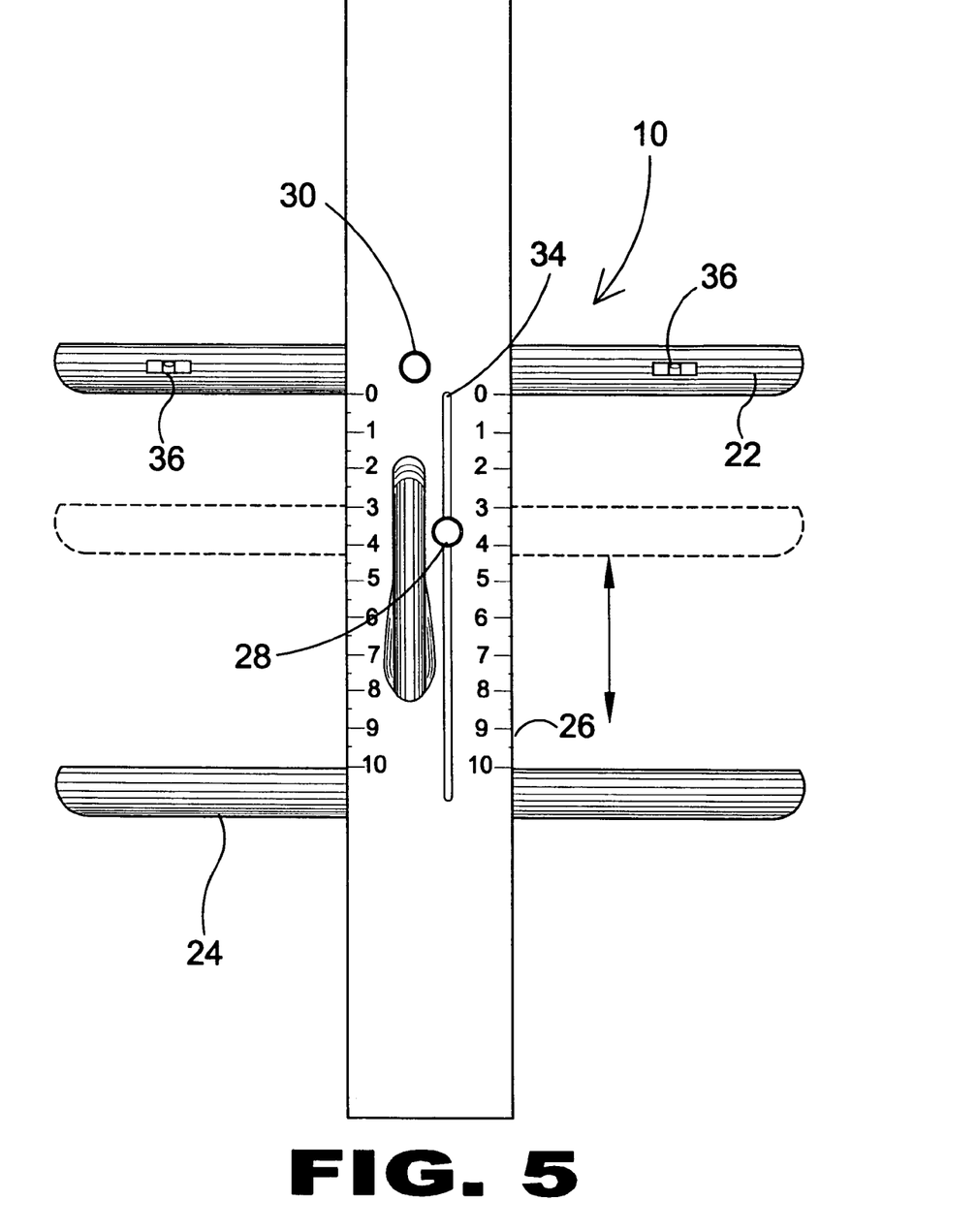
FIG. 5 is a front view of the present invention.

Turning to FIG. 5, shown therein is a front view of the present invention 10. Shown is the present invention 10 disclosing a tool forming a gauge comprising a rule 26 with pivotal transverse members 22, 24 one of which incorporates spaced apart levels 36. The rule member 26 comprises a slot or channel 34 for moving the sliding transverse member 24 relative to the opposing transverse member 22 with levels 36 with the transverse members 24 movable from a transverse position in an operative mode to a co-longitudinal position with the rule portion in a closed position. Other previously disclosed elements are also shown.

Figure 6:
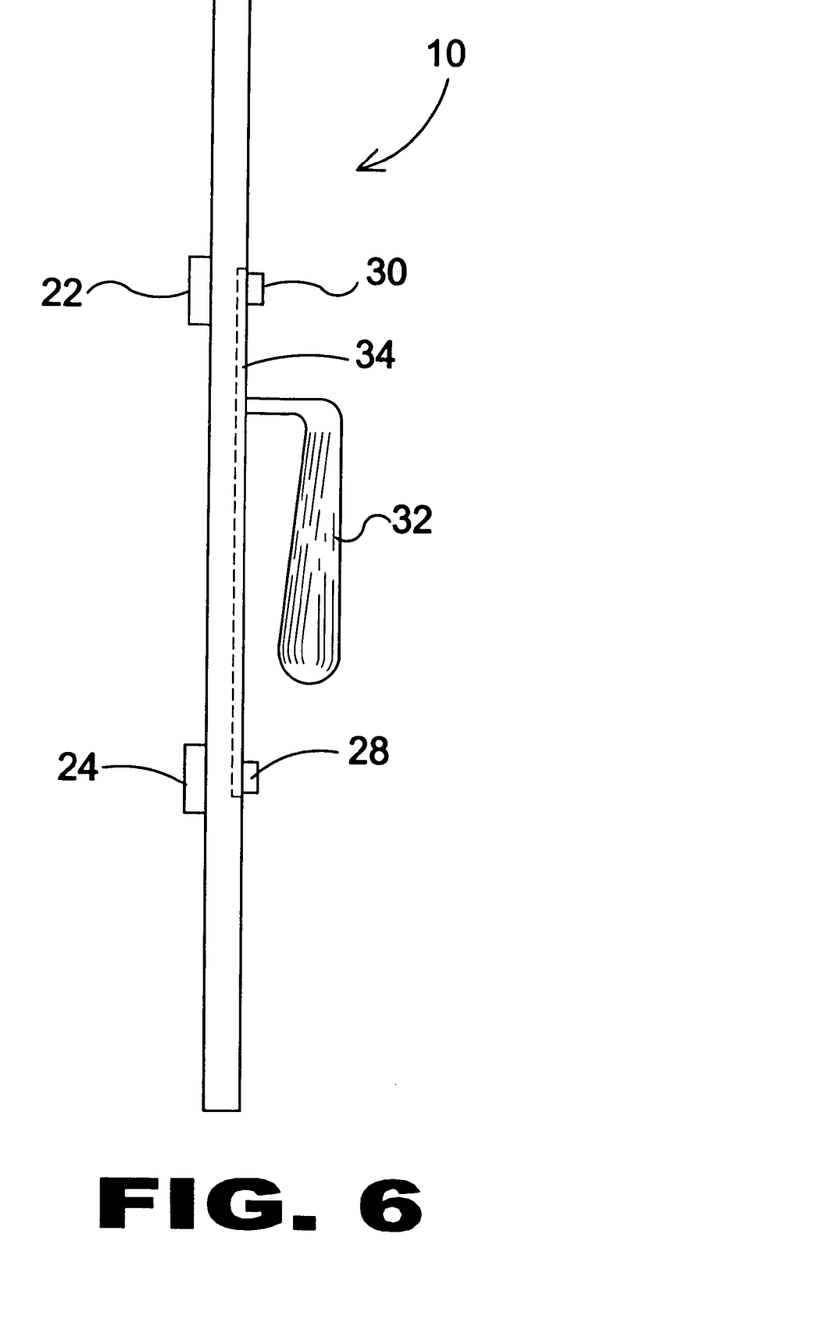
FIG. 6 is a side view of the present invention.

Turning to FIG. 6, shown therein is a side view of the present invention 10. Shown is the present invention 10 disclosing an effective and accurate tool that can be used for siding houses, placing interior and exterior balusters, roofing, spacing on cap walls and numerous other tasks. The device 10 is small enough to pack away and the arms turn into the housing for compact storage. One stable 22 arm turns but does not slide and is equipped with levels for accurate placement. Other previously disclosed elements are also shown.

Figure 7:
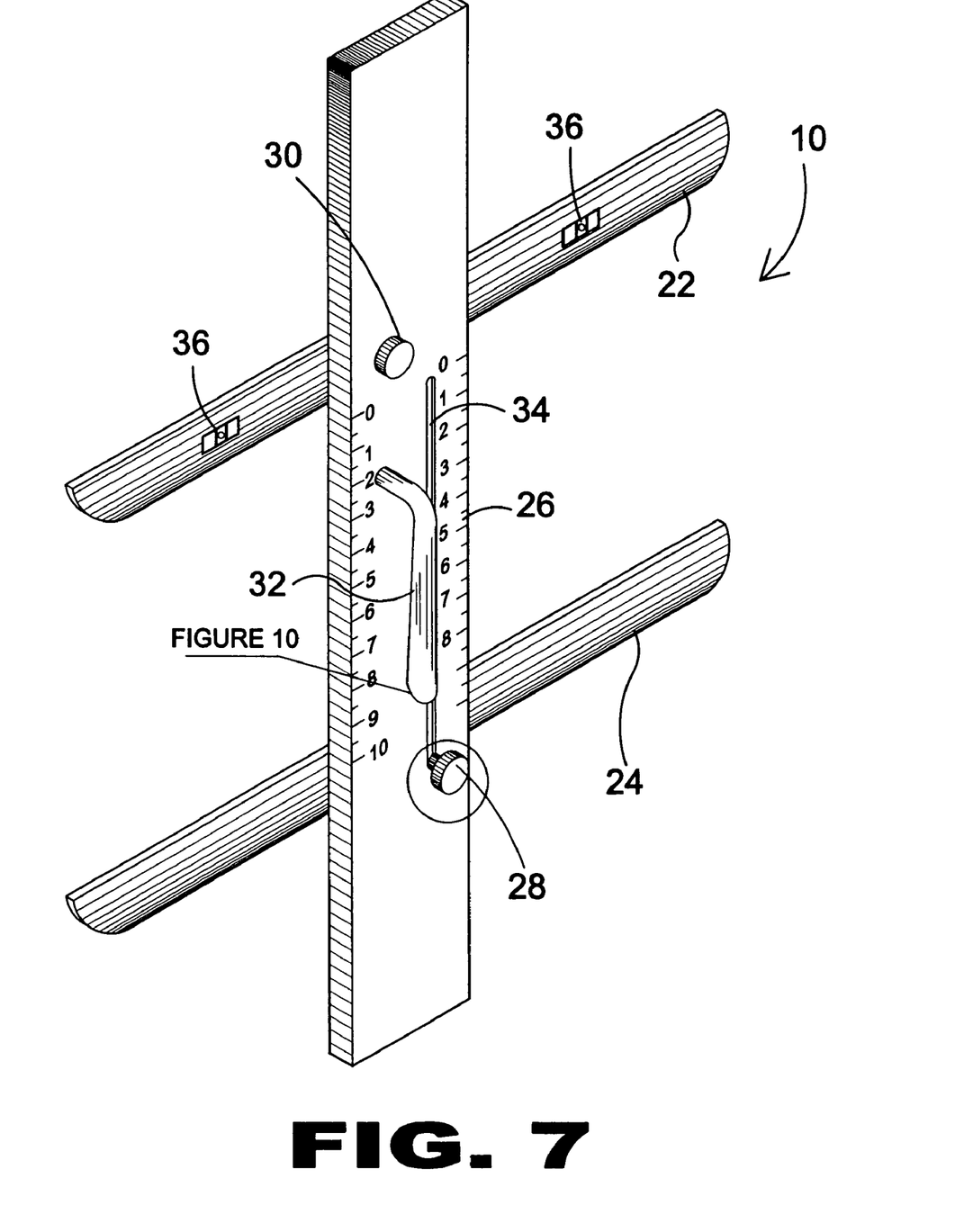
FIG. 7 is a perspective view of the present invention.

Turning to FIG. 7, shown therein is a perspective view of the present invention 10. Shown is a perspective view of the present invention 10 disclosing a tool forming a gauge comprising a rule 26 with pivotal transverse members 22, 24 one of which incorporates spaced apart levels 36. The rule member 26 comprises a slot 34 for moving sliding transverse member 24 relative to the opposing transverse member 22 with levels 36 with the transverse members movable from a transverse position in an operative mode to a co-longitudinal position with the rule portion 26 in a closed position. Other previously disclosed elements are also shown.

Figure 8:
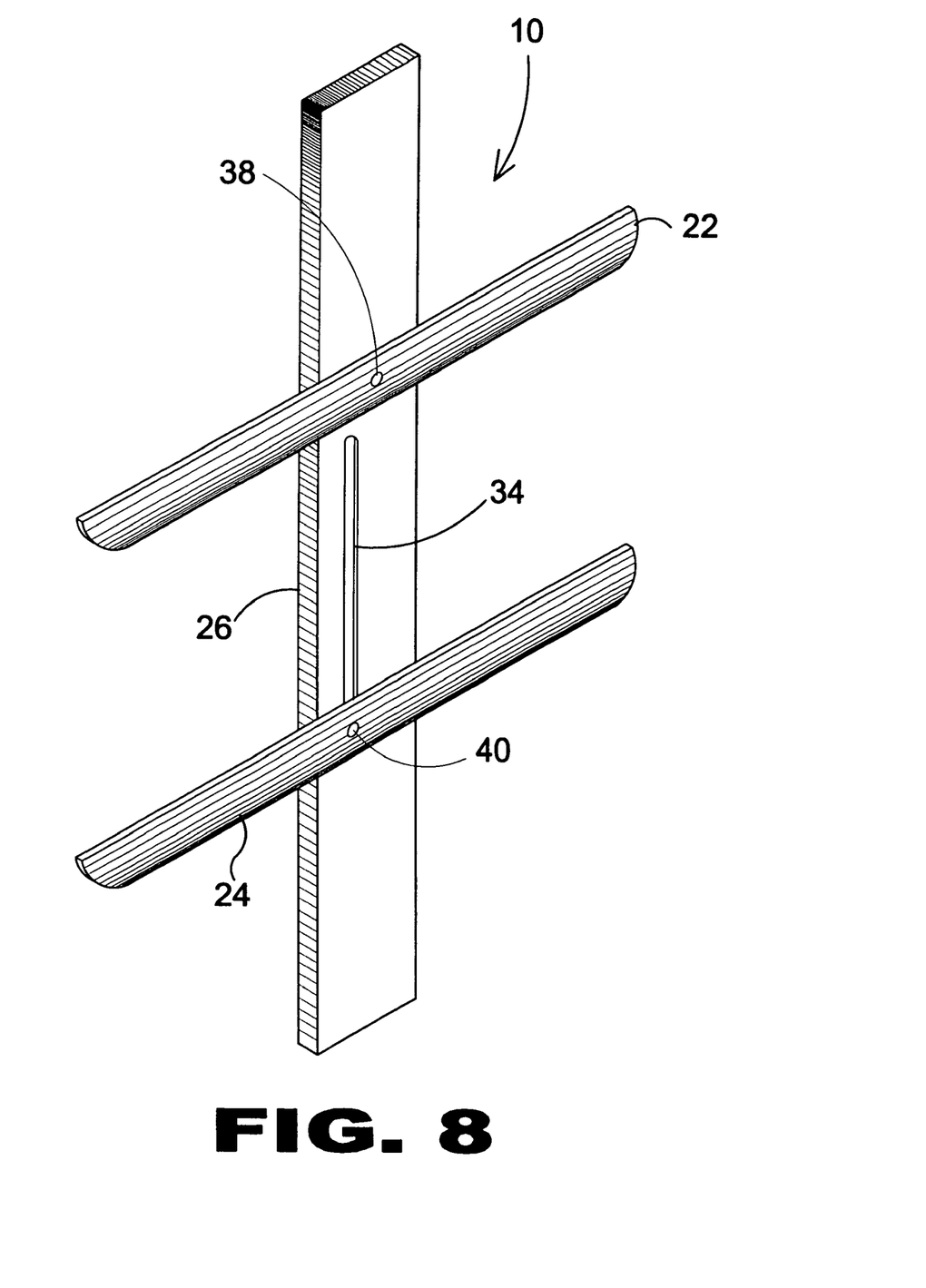
FIG. 8 is a rear side perspective view of the present invention.

Turning to FIG. 8, shown therein is a rear side perspective view of the present invention 10. Shown is a perspective view of the rear side of the present invention 10 disclosing a tool forming a gauge comprising a rule with pivotal transverse members 22, 24 one of which incorporates spaced apart levels. The rule member comprises a slot 34 for moving the transverse member 24 relative to the opposing transverse member 22 with the transverse members movable from a transverse position in an operative mode to a co-longitudinal position with the rule portion 26 in a closed position. Also shown are pivot points 38, 40 for the swing 22 and sliding 24 arms, respectively.

Figure 9:
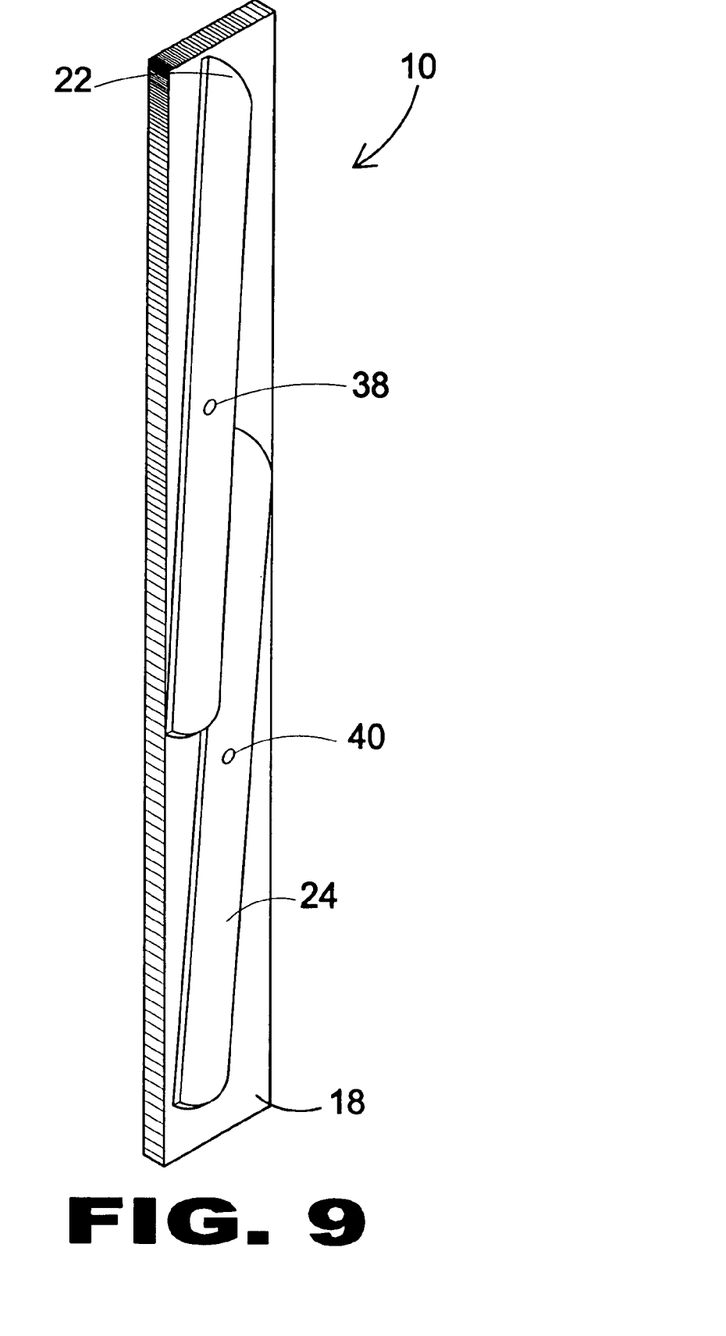
FIG. 9 is a rear side perspective view of the present invention in a folded position.

Turning to FIG. 9, shown therein is a rear side perspective view of the present invention 10 in a folded position. Shown is a perspective view of the rear side of the present invention 10 in a folded position which disclosed a tool forming a gauge comprising a rule with pivotal transverse members 22, 24 entirely contained within the area defined by the bottom of member 18. The rule member comprises a slot for moving the sliding transverse member 24 relative to the opposing transverse member 22 with the transverse members movable from a transverse position in an operative mode to a co-longitudinal position with the rule portion 18 in a closed position. Other previously disclosed elements are also shown.

Figure 10:
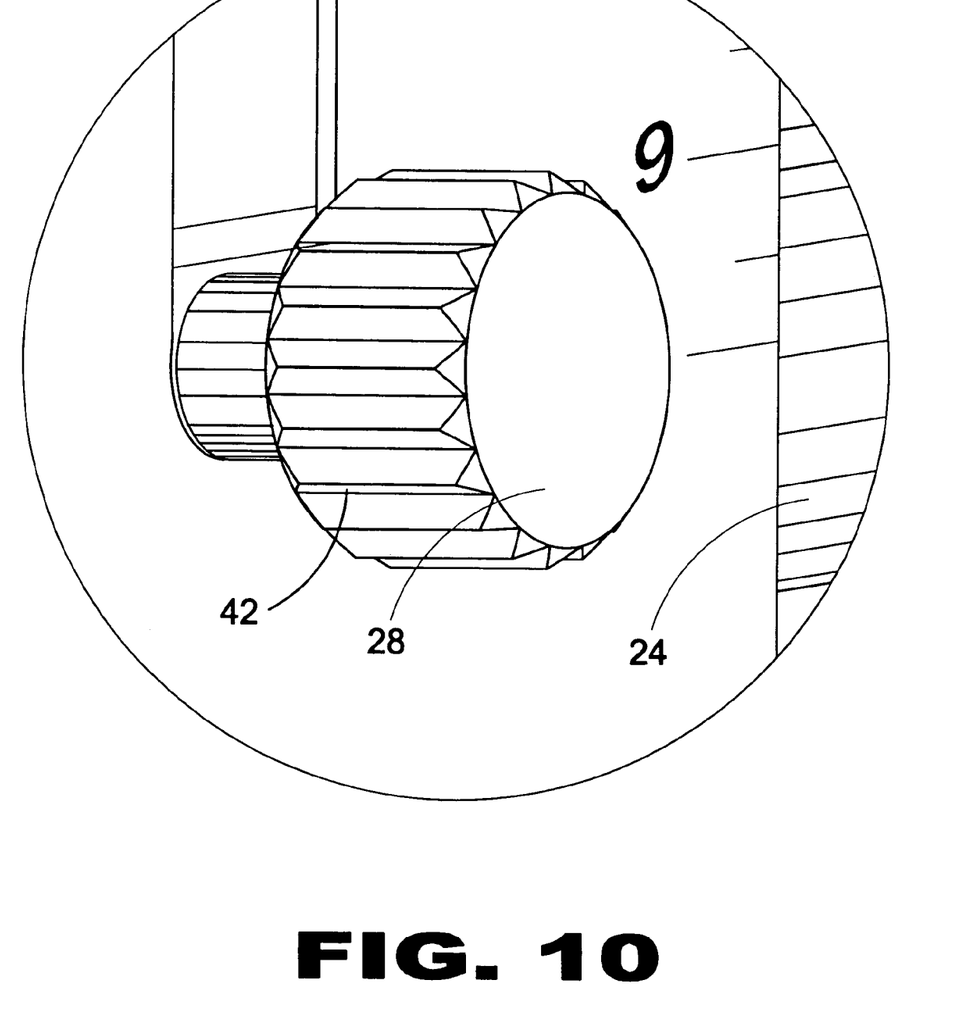
FIG. 10 is a perspective view of the sliding/swing knob of the present invention taken from FIG. 7.

Turning to FIG. 10, shown therein is a perspective view of the sliding knob 28 or the swing knob of the present invention taken from FIG. 7. Shown is a perspective view of the sliding knob 28 or the swing knob of the present invention. Shown is the typical type of knob 28 deemed suitable for operating the fastening of the sliding arm 24 and swing arms of the present invention. Also shown is a knurled at 42 type knob 28 which may provide added comfort when performing the fastening operations of the present invention.

I claim:

1. Apparatus for a measurement gauge for spacing and leveling parallel members, comprising:
   a) an elongated, planar base having first and second opposing ends, top and bottom surfaces, and first and second edges having a slot between and parallel to said first and second edges, said slot being substantially centrally disposed between said first and second ends and between said first and second edges and extending completely through said base from said top surface to said bottom surface, said slot having first and second ends disposed toward said corresponding first and second ends of said base, respectively;
   b) a rule disposed on each of said first and second edges of said top surface of said base extending substantially from said first end to said second end of said slot;
   c) a first transverse member being adjustably pivotally at a fixed location attached to the bottom surface of said base proximate to said first end of said slot and offset to a side of said slot between said slot and said first edge, said first transverse member having first and second ends and being pivoted about a first knob on the top surface of said base at said fixed location on said base;
   d) a second transverse member being pivotally attached to a second knob on the bottom surface of said base, said second knob being slidable in said slot;
   e) said first transverse member having a level disposed on each of said first and second ends of said first transverse member, said levels viewable from the top surface of said base;
   f) said base having dimensions allowing said first and second transverse members to be rotated to a position on the bottom side of said base so that said first and second transverse members are entirely contained within an area defined by said bottom surface of said base for storage of said apparatus.

2. The apparatus of claim 1, further comprising a handle being disposed on said top surface of said base to permit a user to hold the apparatus.

3. The apparatus of claim 2, wherein said second transverse member slides in said slot toward and away from said first transverse member to permit use of the apparatus with parallel members having different spacings thereinbetween.

4. The apparatus of claim 3 in which said knobs include means to lock each of said transverse members in a preselected angular position or unlock said transverse members repositioning.

5. The apparatus of claim 4, wherein said knobs are knurled.

* * * * *